United States Patent [19]
Duff

[11] 3,995,369
[45] Dec. 7, 1976

[54] CATTLE DE-HORNING APPARATUS

[76] Inventor: Qunion R. Duff, Rte. 4, Box 135, Livingston, Tex. 77351

[22] Filed: Aug. 28, 1975

[21] Appl. No.: 608,649

[52] U.S. Cl. .............................................. 30/228
[51] Int. Cl.² ........................................ B26B 15/00
[58] Field of Search .............. 30/228, 24, 180, 182

[56] References Cited
UNITED STATES PATENTS

| | | | |
|---|---|---|---|
| 2,257,245 | 9/1941 | Rudolph | 30/241 X |
| 2,714,250 | 8/1955 | Twedt | 30/180 |
| 3,052,980 | 9/1962 | Fieser | 30/228 |
| 3,152,397 | 10/1964 | Adam | 30/228 |
| 3,177,584 | 4/1965 | Cockerill | 30/228 |
| 3,676,929 | 7/1972 | Nicholson | 30/228 |
| 3,854,204 | 12/1974 | Gonzales | 30/228 |

*Primary Examiner*—Al Lawrence Smith
*Assistant Examiner*—J. C. Peters
*Attorney, Agent, or Firm*—Bard, Springs & Jackson

[57] ABSTRACT

A power-actuated de-horning system is provided wherein a guillotine-type blade is driven through the horn of an animal by means of a hydraulically-actuated cylinder and piston assembly.

2 Claims, 4 Drawing Figures

U.S. Patent    Dec. 7, 1976    3,995,369
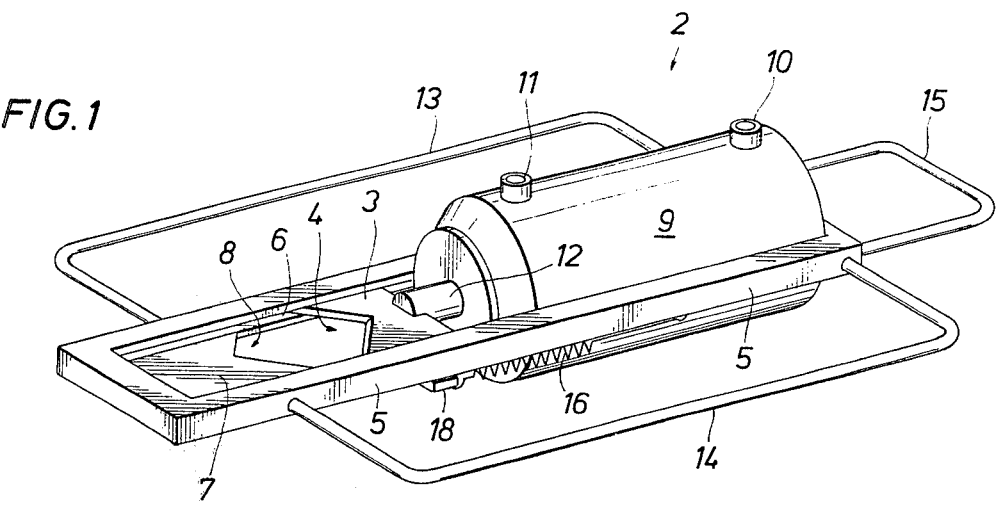
FIG.1
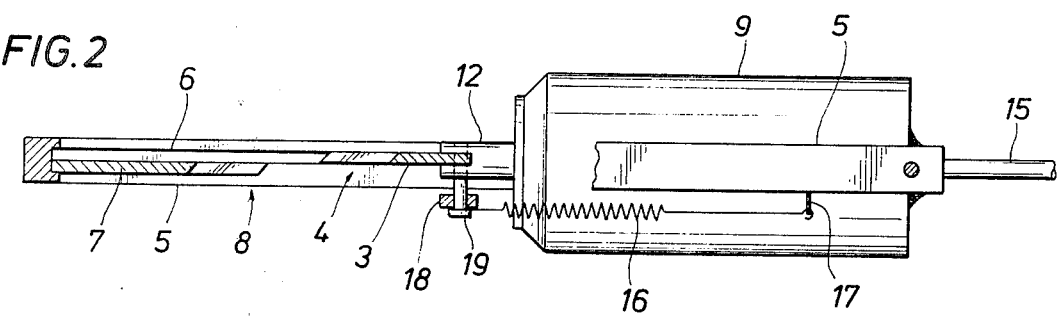
FIG.2
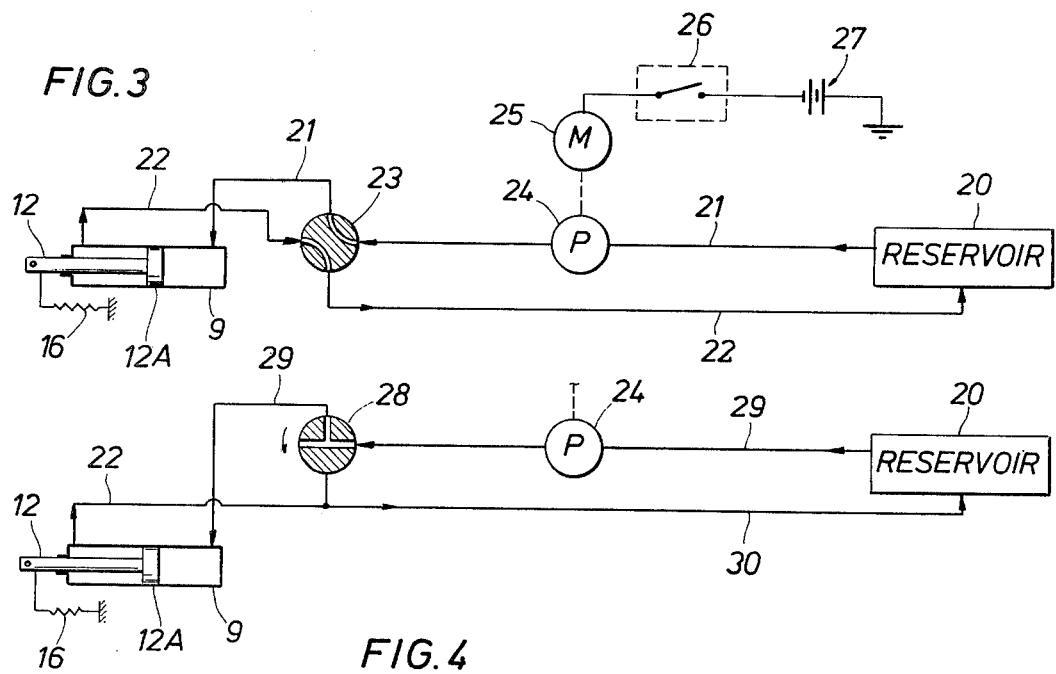
FIG.3
FIG.4

CATTLE DE-HORNING APPARATUS

BACKGROUND OF THE INVENTION:

This invention relates to methods and apparatus for dehorning cattle and the like, and more particularly relates to power-actuated de-horning apparatus.

It is well known that a cow with horns is a danger not only to personnel which must work with and handle the animal, but that it is also a danger to other cattle occupying the same pen. Consequently, it is conventional practice to remove the horns at an early age, not only to eliminate the aforementioned hazards, but also to render the animal more tractable and thus more acceptable to feed lots, etc.

Various cutting devices have been provided for this purpose, and many are now in use. Most, if not all, such dehorners presently in use, however, are manually actuated by means of a pair of long handles, and therein lies their disadvantage. A cow's horn is difficult to cut under the best circumstances, and thus, the cutters now in use require considerable muscular exertion to operate. For this reason alone, a person operating a manually-actuated de-horner must stop work and rest at frequent intervals, and this is an obvious disadvantage whenever a large number of steers are to be de-horned.

A more serious deficiency with any manually operated de-horner is that the device is large and therefore clumsy to manipulate, and that it is also relatively slow in severing the horn. A steer is ordinarily put under a restraint while being de-horned, of course, but if the operation takes longer than a minimum length of time, the animal will usually become agitated. Accordingly, if the animal moves its head while its horns are being cut, the de-horner may be inadvertently shifted too close to the animal's scalp and this may then cause injury to the steer. In the alternative, the de-horner may be shifted too far from the animal's scalp so as to leave a projecting stub which is almost as dangerous as is the original horn. Furthermore, if the animal abruptly tosses its head while the de-horner is positioned on its horn, the long handles may cause an injury to the operator.

These disadvantages of the prior art are overcome with the present invention, and improved methods and apparatus are hereinafter set forth which comprise a powered de-horner which is not only lighter and therefore easier to manipulate and use, and which also cuts the horn in a fraction of the time required with the use of a manually operated de-horner, but which is also operated with minimum physical effort on the part of the user.

SUMMARY OF THE INVENTION:

In a preferred embodiment of the present invention, a guillotine-type cutting device is provided with a hydraulically actuated cylinder assembly for driving a movable knife blade shearingly past a stationary blade of similar configuration. More particularly, the movable blade is slidably positioned between a pair of guide bars or rails and is further mounted on the end of the piston rod of the hydraulic cylinder. The stationary blade is also positioned between the guide rails, but at a point spaced from the movable blade and with its cutting edge substantially facing the cutting edge of the movable blade.

The two blades are normally spaced apart when the cylinder is inactivated, in order to provide a space for receiving the horn sought to be cut. However, both blades are preferably provided with notched or V-shaped cutting edges to facilitate positioning the horn midway along each of the two cutting edges. Accordingly, when the hydraulic cylinder is actuated, the piston rod will extend in a manner to abruptly thrust the movable blade against the horn and to and shearingly past the cutting edge of the stationary blade, whereby the horn is severed with a fraction of time and effort normally required with a manually operated de-horner. The apparatus may conveniently be provided with handles whereby the user can manually install or remove the de-horner from the animal sought to be polled. In addition, the movable blade may be connected to a resilient member such as a spring which operates to automatically retract and re-position the movable blade upon deactivation of the cylinder.

Other forms of actuators may be used for these purposes, of course, such as an electric motor or solenoid. A fluid-driven cylinder and piston assembly has been found to be especially suitable for these purposes, however, since it is capable of driving the movable blade with greater force in proportion to its size and weight, and since it does not create a noise such as will alarm other animals in the vicinity. Furthermore, a fluid-actuated cylinder assembly is relatively simple and sturdy, in contrast with actuators such as solenoids and electric motors.

These and other features and advantages will become apparent from the following detailed description, wherein reference is made to the figures in the accompanying drawing.

IN THE DRAWING:

FIG. 1 is a simplified pictorial representation of apparatus embodying the concepts of the present invention.

FIG. 2 is also a simplified pictorial representation, partly in cross-section, of the apparatus depicted in FIG. 1, and further illustrating certain components and features not otherwise visible.

FIG. 3 is a simplified schematic representation of an over-all system for de-horning cattle according to the concepts of the present invention.

FIG. 4 is also a simplified pictorial representation of another form of the system.

DETAILED DESCRIPTION:

Referring now to FIG. 1, there may be seen a simplified pictorial representation of an exemplary form of a de-horner assembly 2 which includes a movable knife blade 3 having a V-shaped or notch 4 in its cutting edge, and which is supported in a frame 5 composed of a pair of spaced-apart rails having confronting internal grooves 6, whereby the movable blade 3 is slidably movable within these grooves 6. In addition, it may be seen that the frame 5 is further provided with a similar stationary blade 7 which is fixedly mounted between the rails of the frame 5 at one end, and which is further provided with a similar V-shaped or notch 8 confronting the cutting edge of the movable blade 3. A suitable cylinder assembly 9 is disposed within the frame 5 at its opposite end, with its piston rod 12 secured to the butt end of the movable blade 3, whereby actuation of the cylinder assembly 9 will cause the piston rod 12 to become extended so as to thrust the movable blade 3 abruptly towards the oppositely arranged stationary blade 7. In this respect, it should be further noted that the stationary blade 7 is preferably mounted either above or below the grooves 6, whereby the movable blade 3 will move shearingly past the stationary blade 7 in an overlapping manner.

Referring again to FIG. 1, it will be noted that the frame is preferably provided with a rectangular configuration, and that it is further preferably provided with a pair of side handles 13, 14 and an end handle 15 at the opposite end from the stationary blade 7. In this respect, the operator of this apparatus will normally manipulate and position the de-horner assembly 2 by holding its side handles 13, 14, and that the de-horner assembly 2 may otherwise be carried conveniently by means of its end handle 15.

The cylinder assembly 9 may be actuated conveniently by either hydraulic or pneumatic pressure, although hydraulic pressure has been found especially suitable for the purposes of the present invention. Accordingly, the cylinder assembly 9 is preferably provided with ports 10, 11 for purposes of interconnection with the hydraulic or pneumatic power, as hereinafter will be explained.

Referring again to the de-horner assembly 2 depicted in FIG. 1, it will further be noted that this form of apparatus is preferably arranged to assume the configuration depicted in FIG. 1 prior to actuation of the hydraulic pressure to the cylinder assembly 9. Accordingly, when hydraulic pressure is applied to port 10, (and port 11 is connected to the return line) the hydraulic pressure will be applied to the piston (not depicted) to drive the piston rod 12 and movable left blade 3 towards and past the stationary blade 7 as hereinbefore explained. The movable blade 3 may be retracted from the stationary blade 7 by hydraulic pressure being shifted from port 10 to port 11, but a more convenient arrangement is to merely discontinue hydraulic pressure from port 10 and to permit the movable blade 3 to be shifted away from the stationary blade 7 by means of a retract spring 16 which, in turn, is interconnected between the frame 5 and a strap or cross-member 18 fixedly attached to the piston rod 12.

The apparatus of the type illustrated by the de-horner assembly 2 is employed for its intended purpose by lifting it with the side handles 13 and 14 and by thereafter disposing it over the horn of the animal (not depicted), whereby the horn (not depicted) is disposed in the space defined by the notches 4, 8 in the cutting edges of the movable and stationary blades 3, 7. Thereafter, when hydraulic pressure is applied to port 10 of the cylinder assembly 9, and when the piston rod 9 is abruptly extended as hereinbefore explained, the movable blade 3 will shear through the horn to slide across the upper surface of the stationary blade 7. Thereafter, if hydraulic pressure is then merely removed or discontinued from port 10 as hereinbefore suggested, the retract spring 7, which was also extended by the forward movement of the movable blade 3, will draw the movable blade 3 away from the stationary blade 7 to its original position within the frame 5.

Referring now to FIG. 2, there may be seen another pictorial representation, partly in cross-section, of the apparatus previously discussed with respect to FIG. 1. More particularly, it may be seen how the movable blade 3 is slidably positioned within the grooves 6 of the frame 5 so as to slide forward and shearingly past the upper surface of the stationary blade 5 as previously explained. In addition, it may be further seen how the retract spring 16 is preferably fastened at one end to a pin 17 or other suitable mooring or anchoring means attached to the frame 5, and at its other end to the strap 18 which, in turn, is fastened at its mid-point to the outer end of the piston rod 12 by means of a suitable bolt 19.

Referring now to FIG. 3, there may be seen a simplified schematic diagram of an overall system for de-horning cattle according to the principles of the present invention, and which includes a suitable hydraulic actuating system as well as the de-horner 2 or other suitable means. More particularly, it will be seen that FIG. 3 contains a simplified pictorial representation of the cylinder assembly 9, which in turn, contains the piston rod 12 and the piston 12a hereinbefore mentioned. Accordingly, the piston 12a is driven against the retract spring 16 (to sever a horn) whenever hydraulic pressure is received by way of line 21, and that it is the retract spring 16 which re-drives or re-inserts the piston rod 12 into the cylinder assembly 9 whenever the pressure in line 21 is equal to or less than the pressure in line 22 which is also connected to the cylinder assembly 9 at its opposite end.

As indicated in FIG. 3, the system preferably includes a supply of hydraulic fluid which may be conveniently provided by means of a non-pressurized reservoir 20 having a return line 22 extending to the cylinder assembly 9 as hereinbefore explained, and having another line 21 extending to provide fluid to the pump 24. Accordingly, a function of the pump 24 is to receive hydraulic fluid from line 21 and deliver such fluid to and through a control valve 23 to the cylinder assembly 9 in such a manner as to cause the piston rod 12 to be extended. Accordingly, the pump 24 is preferably connected to the shaft of a suitable electric motor 25 which, in turn, is connected to a suitable power supply 27 by means of suitable on-off switch 26. In other words, when the switch 26 is closed, this will cause the power supply 27 to actuate the motor 25, whereby the pump 24 will be driven to actuate the cylinder assembly 9 by means of hydraulic fluid delivered from the reservoir 20.

In this respect, the control valve 23 is suitably provided with a configuration such that when the valve 23 is rotated to a position so that when the control valve 23 is positioned to connect the pump 24 to the cylinder assembly 9 by way of line 21, any fluid leaking past the piston 12a to the opposite end of the cylinder assembly 9 will be ejected out through the line 22 to be returned to the reservoir 20.

In an alternative arrangement of the apparatus depicted in FIG. 3, the valve may be positioned as indicated, whereby the pump 24 will deliver hydraulic fluid through line 21 and the valve 23 to extend the piston 12a in the cylinder 9, and whereby the valve 23 may be rotated so as to completely disconnect the pump 24 from the cylinder 9 to permit the retract spring 16 to retract the piston 12a and piston rod 12 into the cylinder 9. In other words, lines 21, 22, which are connected directly to the cylinder 9, will be interconnected by a valve port, when the valve 23 is returned to this alternative position, and whereby lines 21 and 22 which lead to the reservoir 20 will be interconnected through the other valve port. In this alternative arrangement, the pump 24 may continually operate, rather than being inactivated by the switch 26, since fluid will either be delivered through line 21 to the cylinder 9 or else it will be returned through line 22 directly into the reservoir 20.

Referring now to FIG. 4, there may be seen another simplified pictorial representation of an alternative apparatus, whereby a control valve 28 of a configuration different from the valve 23 depicted in FIG. 3 is employed. More particularly, it will be noted that, in this arrangement, when the valve 28 is rotated so as to connected line 29 through the valve 28 to the cylinder 9, this will cause the piston 12a and piston rod 12 to be extended in opposition to the retract spring 16. If the valve 28 is then rotated 90° in a counterclockwise direction, this will disconnect the pump 24 from the cylinder 9, couple line 29 through the valve 28 to line 30, whereby fluid in the cylinder 9 will be conducted from one side of piston 12a to the other side when the retract spring 16 retracts the piston rod 12 into the cylinder 9. In such an arrangement, it is desirable that the pump 24 be inactivated by opening switch 26, since the pump 24 would otherwise operate to drive hydraulic fluid from the reservoir 20 to a blocked valve 28.

Referring again to FIG. 4, if the control valve 28 is rotated 90° further in a counterclockwise direction, it will be seen that the pump 24 will then conduct hydraulic fluid from the reservoir 20 through the valve 28 and into both lines 22 and 30. Although the pump 24 is now connected to deliver hydraulic fluid into the retract port of the cylinder 9, the piston 12a will not move in the cylinder 9 because of the fact that its opposite side is blocked by hydraulic fluid trapped in the cylinder 9 by the fact that the valve 28 blocks line 29.

If the valve 28 in FIG. 4 is now rotated an additional 90° in a counterclockwise direction, it may be seen that the pump 24 is now connected to both lines 29 and 30, whereby the pump rotates fluid to both sides of the piston 12a in the cylinder 9, and also into the reservoir 20. Under this arrangement, it will be apparent that the piston 12a will only be moved by the action of the retract spring 16.

In all of the arrangements depicted and discussed with respect to the accompanying drawing, it should be noted that the principal objective is to provide a system wherein the de-horner assembly 2 is relatively light in weight and convenient to manipulate, and which is further actuable with a minimum amount of time and effort. In accordance with such objectives, it will be apparent that it is a significant feature of this invention that the apparatus be convenient and simple to actuate, not only with respect to the means by which the movable blade 3 is driven through the horn, but also by virtue of being actuated with a minimum amount of manipulation of the de-horner assembly 2 itself.

It is within the contemplation of this invention that the switch 26 be located on or adjacent the de-horner assembly 2, whereby the operator of this apparatus can not only position the de-horner assembly 2 adjacent the horn of the animal to be treated, but that the operator may himself actuate the de-horner assembly 2. It should be appreciated, however, that positioning the de-horner assembly 2 on the animal is a most important feature of removing the animal's horns, and thus it is also within the scope of this invention that the switch 26 be arranged whereby it can be conveniently operated by other personnel at the command of the person manipulating the de-horner assembly 2.

Other modifications will be readily apparent from an examination of the apparatus depicted in the accompanying drawing, and the detailed description hereinbefore given. Accordingly, it should be clearly understood that the embodiments of the invention depicted in the drawing and described herein are intended to be exemplary only, and are not intended to be limitations on the scope of the invention.

What is claimed is:

1. Apparatus for de-horning cattle and the like, comprising:
   a frame member having a blade portion fixedly supported therein,
   a movable knife member slidably supported in said frame member,
   fluid-actuated driving means having an extend port and a retract port for driving said knife member into shearing engagement with said blade portion of said frame member,
   reservoir means for supporting a quantity of fluid under ambient pressure,
   selectively actuated pump means having an intake port and an outlet port,
   first line means interconnected between said reservoir means and said intake port of said pump means,
   second line means interconnected with and extending from said outlet port of said pump means,
   third line means interconnected with and extending from said reservoir means,
   fourth line means interconnected with and extending from said extend port of said driving means,
   fifth drain line means interconnected with and extending from said retract port of said driving means, and
   valve means for selectively interconnecting said second and fourth line means and said third and fifth line means for selectively energizing said driving means during actuation of said pump means.

2. Apparatus for de-horning cattle and the like, comprising:
   a frame member having a blade portion fixedly supported therein,
   a movable knife member slidably supported in said frame member,
   fluid-actuated driving means having an extend port and a retract port for driving said knife member into shearing engagement with said blade portion of said frame member,
   reservoir means for supporting a quantity of fluid under ambient pressure,
   selectively actuated pump means having an intake port and an outlet port,
   first line means interconnected between said reservoir means and said intake port of said pump means,
   second line means interconnected with and extending from said outlet port of said pump means,
   third line means interconnected with and extending from said reservoir means,
   fourth line means interconnected with and extending from said extend port of said driving means,
   fifth drain line means interconnected with and extending from said retract port of said driving means,
   valve means for selectively interconnecting said second and fourth line means and said third and fifth line means respectively when in a first position for selectively energizing said driving means during actuation of said pump means, and for selectively interconnecting said second, third, fourth and fifth line means when in a second position for selectively de-energizing said driving means during actuation of said pump means, and
   a resilient member interconnected between said frame member and said movable knife member for retracting said movable knife member when said valve means is in said second position.

* * * * *